United States Patent
Narula et al.

(10) Patent No.: US 9,989,116 B2
(45) Date of Patent: Jun. 5, 2018

(54) BRAKE SYSTEM AND METHOD OF ADJUSTING A BRAKE

(71) Applicant: MERITOR HEAVY VEHICLE BRAKING SYSTEMS (UK) LIMITED, Cwmbran, Gwent (GB)

(72) Inventors: Prashant Narula, Gwent (GB); Martin Pors Taylor, Gwent (GB); Mikael Hansson, Gwent (GB)

(73) Assignee: Meritor Heavy Vehicle Braking Systems (UK) Limited, Cwmbran, Gwent (GB)

( * ) Notice: Subject to any disclaimer, the term of this patent is extended or adjusted under 35 U.S.C. 154(b) by 0 days. days.

(21) Appl. No.: 14/447,948

(22) Filed: Jul. 31, 2014

(65) Prior Publication Data

US 2015/0047929 A1    Feb. 19, 2015

(30) Foreign Application Priority Data

Aug. 15, 2013   (EP) ..................................... 13180589

(51) Int. Cl.
  *B60T 13/66* (2006.01)
  *F16D 65/62* (2006.01)
  (Continued)

(52) U.S. Cl.
  CPC .............. *F16D 65/62* (2013.01); *B60T 7/042* (2013.01); *B60T 7/22* (2013.01); *B60T 13/741* (2013.01); *F16D 55/22* (2013.01); *F16D 55/226* (2013.01); *F16D 65/092* (2013.01); *F16D 65/18* (2013.01); *F16D 65/567* (2013.01);
  (Continued)

(58) Field of Classification Search
  CPC . B60T 7/042; B60T 7/22; F16D 65/62; F16D 65/183; F16D 2065/386
  USPC ........ 188/1.11 L, 1.11 E, 1.11 W, 71.7–71.9, 188/72.7–72.9; 303/20; 701/70–72
  See application file for complete search history.

(56) References Cited

U.S. PATENT DOCUMENTS 3,976,168 A    8/1976   Yamamoto
6,237,729 B1 *  5/2001   Blattert ................. B60T 13/741
                                        188/1.11 E
(Continued)

FOREIGN PATENT DOCUMENTS

DE    19758030 A1    8/1998
DE    19935934 A1    2/2000
(Continued)

OTHER PUBLICATIONS

European Patent Office, Extended Search Report for the corresponding European Patent Application No. 13180589.7 dated Dec. 20, 2013.

(Continued)

*Primary Examiner* — Christopher P Schwartz
(74) *Attorney, Agent, or Firm* — Brooks Kushman P.C.

(57) ABSTRACT

A brake system and method of adjusting a brake. The method may include the steps of providing a mechanically operated brake including friction material, providing a rotor, providing an adjuster for adjusting a running clearance between the friction material and the rotor, providing a sensor system for determining a likelihood of a braking event, and upon a determination of a change in the likelihood of a braking event operating the adjuster to adjust the running clearance of the brake.

10 Claims, 1 Drawing Sheet

(51) Int. Cl.
*B60T 7/22* (2006.01)
*B60T 7/04* (2006.01)
*F16D 55/22* (2006.01)
*F16D 55/226* (2006.01)
*F16D 65/092* (2006.01)
*F16D 65/18* (2006.01)
*B60T 13/74* (2006.01)
*F16D 65/56* (2006.01)
*F16D 121/02* (2012.01)
*F16D 125/36* (2012.01)
*F16D 125/40* (2012.01)
*F16D 129/10* (2012.01)

(52) U.S. Cl.
CPC ...... *F16D 2121/02* (2013.01); *F16D 2125/36* (2013.01); *F16D 2125/40* (2013.01); *F16D 2129/10* (2013.01)

(56) References Cited

U.S. PATENT DOCUMENTS

| | | | | |
|---|---|---|---|---|
| 6,250,436 | B1* | 6/2001 | Oikawa | B60T 1/065 188/1.11 E |
| 6,367,592 | B1* | 4/2002 | Kapaan | F16D 65/18 188/158 |
| 6,481,805 | B1* | 11/2002 | Ichinose | B60T 7/042 188/72.3 |
| 7,025,181 | B2* | 4/2006 | Affeldt | B60T 17/083 188/170 |
| 7,527,339 | B2* | 5/2009 | Iizuka | B60T 7/12 303/11 |
| 7,712,588 | B2* | 5/2010 | Caron | B60T 17/221 188/1.11 L |
| 7,806,486 | B2* | 10/2010 | Bitz | B60T 8/4081 303/191 |
| 8,177,308 | B2* | 5/2012 | Ralea | B60T 8/00 188/1.11 L |
| 2002/0026273 | A1* | 2/2002 | Tamura | B60T 7/22 701/70 |
| 2002/0112927 | A1* | 8/2002 | Giering | F16D 65/183 188/1.11 W |
| 2003/0184155 | A1* | 10/2003 | Crombez | B60L 7/26 303/152 |
| 2005/0199452 | A1* | 9/2005 | Ward | F16D 55/224 188/71.7 |
| 2005/0206236 | A1* | 9/2005 | Mori | B60T 8/4872 303/175 |
| 2005/0269872 | A1* | 12/2005 | Ralea | B60T 8/00 303/20 |
| 2006/0049687 | A1* | 3/2006 | Iizuka | B60T 7/12 303/11 |
| 2007/0052289 | A1* | 3/2007 | Nilsson | B60T 8/885 303/20 |
| 2007/0235268 | A1 | 10/2007 | Caron | |
| 2007/0244618 | A1* | 10/2007 | Phillips | B60T 7/042 701/70 |
| 2008/0058162 | A1* | 3/2008 | Schmidt | B60T 8/17555 477/184 |
| 2009/0195057 | A1* | 8/2009 | Niino | B60T 13/686 303/15 |
| 2010/0253136 | A1* | 10/2010 | Greer | B60T 8/4275 303/84.2 |
| 2011/0031072 | A1* | 2/2011 | Leiber | B60T 8/00 188/72.3 |
| 2011/0106381 | A1* | 5/2011 | Filev | B62D 6/007 701/40 |
| 2012/0168264 | A1* | 7/2012 | Putz | F16D 65/18 188/71.8 |
| 2013/0261890 | A1* | 10/2013 | Roberts | F16D 65/568 701/36 |
| 2015/0360671 | A1* | 12/2015 | Williams | B60T 13/746 701/70 |
| 2016/0076609 | A1* | 3/2016 | Narula | B60T 17/22 188/73.33 |
| 2016/0084330 | A1* | 3/2016 | Gibbens | F16D 55/225 701/70 |

FOREIGN PATENT DOCUMENTS

| | | |
|---|---|---|
| DE | 19861109 A1 | 3/2000 |
| DE | 10256426 A1 | 6/2004 |
| EP | 0789156 A1 | 8/1997 |
| EP | 0995921 A2 | 4/2000 |
| EP | 0995923 A2 | 4/2000 |
| EP | 1233202 A2 | 8/2002 |
| EP | 1000263 | 6/2004 |
| EP | 152449 A1 | 4/2005 |
| EP | 1544493 A1 | 6/2005 |
| EP | 1972825 A1 | 9/2008 |
| FR | 2757918 A1 | 7/1998 |
| GB | 2063399 A | 6/1981 |
| WO | 2005036012 A1 | 4/2005 |
| WO | 2006032447 A1 | 3/2006 |
| WO | 2007051809 A1 | 5/2007 |

OTHER PUBLICATIONS

European Patent Office, Communication for the corresponding European Patent Application No. 13180589.7 dated Feb. 19, 2018.

* cited by examiner

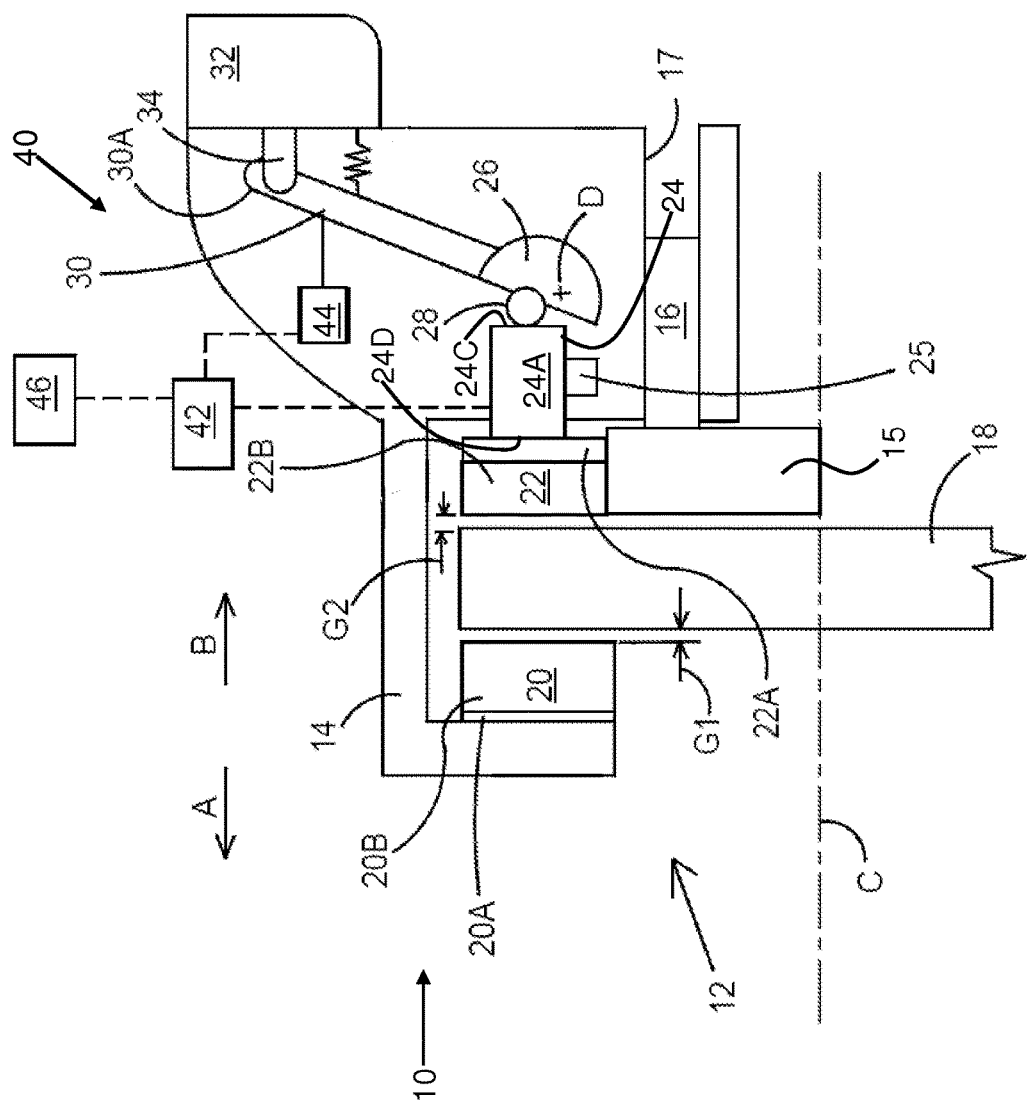

BRAKE SYSTEM AND METHOD OF ADJUSTING A BRAKE

TECHNICAL FIELD

The present invention relates to a brake system and a method of adjusting a brake, in particular a brake for land vehicle, in particular heavy land vehicles such as a truck or lorry or coach or bus.

BACKGROUND

Vehicle brakes are known whereby a brake rotor, such as a brake disc or a brake drum is attached to a vehicle wheel so as to rotate with that vehicle wheel. Non-rotating friction material, such as friction material on a brake pad or on a brake shoe can be frictionally engaged with the rotor so as to slow or stop the vehicle.

When it is not required to slow or stop the vehicle, the brake system is arranged so that a relatively small clearance, known as a running clearance, is provided between the rotor and the friction material. This running clearance is arranged to prevent brake drag. Brake drag is an unnecessary frictional drag, which causes increased fuel consumption, and increased wear of brake components. Accordingly brake drag is undesirable.

EP1000263 shows an example of a mechanically operated brake wherein the running clearance is automatically adjusted as the brake pads wear as a result of normal engagement and disengagement of the brake.

The automatic adjustment mechanism is designed to provide a predetermined running clearance for the brake. The running clearance is typically determined during the design process of the brake and depends upon various factors including rotor thickness, friction material thickness and other criteria of the brake assembly and associated vehicle.

One consideration when designing the running clearance is that the vehicle must be able to brake from its maximum speed or on a steep descent to a standstill and then, immediately be able to release the brakes and drive on. As will be appreciated, when a vehicle brakes from its maximum speed or on a steep descent to a standstill a considerable amount of kinetic energy is converted into heat energy by the brakes. This heat energy causes various brake components to heat up and therefore expand. In particular, where the brake is a disc brake, the brake disc and the friction material of the brake pads will expand. This expansion causes the running clearance of a hot brake to be smaller than the running clearance of a cool brake. Accordingly, the normal cool running clearance of a brake must be sufficiently large such that when the brake becomes hot (for example after being braked to a standstill from a maximum running speed of the associated vehicle) there still exists a running clearance to enable the vehicle to continue its journey. If the cool running clearance is too small, when the vehicle has braked to a standstill from its maximum speed, the friction material will be pressed into engagement with the rotor, and the vehicle will be unable to continue its journey, until such time as the brake components have cooled down.

However, when brakes which have a running clearance are applied, the friction material has to be moved over the distance of the running clearance before any braking force is applied to the rotor. Thus there is a short time delay between when the brake pads start to move, and when they start to apply a braking force.

EP0995923 shows an example of an electrically actuated adjuster mechanism which endeavours to maintain a constant running clearance.

Accordingly, in known brake designs the running clearance must be sufficient to ensure a running clearance when the brake is both hot and cool and to ensure that brake drag does not occur, but must not be so large so as to cause a significant time delay between when the brake pads start to move and when a brake force is applied to the rotor.

Thus, one object of the present invention is to provide an improved brake.

SUMMARY

Thus, according to the present invention there is provided a method of adjusting a brake, the method including the steps of:
  providing a mechanically operated brake including friction material,
  providing a rotor,
  providing an adjuster for adjusting a running clearance between the friction material and the rotor,
  providing a sensor system for determining a likelihood of a braking event, and
  upon a determination of an increase in the likelihood of a braking event operating the adjuster to adjust the running clearance of the brake.

Upon a determination of an increased likelihood above a predetermined likelihood of a braking event, the adjuster may operate to adjust the running clearance of the brake.

The running clearance may be adjusted to reduce the running clearance.

The running clearance may be adjusted to reduce the running clearance to substantially zero.

The running clearance may be adjusted to increase the running clearance.

The sensor system may define a collision avoidance system and/or a lane departure warning system.

The collision avoidance system and/or a lane departure warning system may include a camera having a field of vision, which field of vision includes the terrain ahead of an associated vehicle.

The collision avoidance system and/or lane departure warning system may include a camera having a field of vision, which field of vision includes an operator of an associated vehicle.

The sensor system may be capable of determining a position and velocity of an associated vehicle.

The sensor system may include data relating to terrain.

The sensor system may include a navigational system, preferably a satellite navigational system.

The sensor system may be capable of determining the ambient conditions relative to an associated vehicle.

The sensor system may be capable of determining the ambient temperature.

The sensor system may include a rain sensor.

The sensor system may include a throttle position sensor.

The method may include the step of:
  subsequently, upon a determination of a decreased likelihood of a braking event operating the adjuster to adjust the running clearance of the brake.

According to a further aspect of the present invention there is provided a method of adjusting a brake, the method may include the steps of:

a) providing a mechanically operated brake including friction material, providing a rotor, providing an adjuster for adjusting a running clearance between the friction material and the rotor, b) determining a temperature of a brake component, c) determining a desired running clearance based on the temperature, and d) operating the adjuster to adjust the running clearance to the desired running clearance.

The method may further include the steps of repeating steps b), c) and d).

Step c) may include the step of determining a state of wear of a brake component and the desired running clearance is further based on the state of wear of the brake component.

The method may include providing a sensor system for determining a likelihood of a braking event, and wherein the desired running clearance is further based on the likelihood of a braking event.

According to a further aspect of the present invention there is provided a method of adjusting a brake, the method may include the steps of:

a) providing a mechanically operated brake including friction material, providing a rotor, providing an adjuster for adjusting the running clearance between the friction material and the rotor, b) determining a state of wear of the brake component, c) determining a desired running clearance based on the state of wear of the brake component, and d) operating the adjuster to adjust the running clearance to the desired running clearance.

The adjuster may be an electrically operated adjuster.

According to a further aspect of the present invention there is provided a brake system including a mechanically operated brake including friction material, a rotor, an adjuster for adjusting a running clearance between the friction material and the rotor, a sensor system for determining a likelihood of a braking event, the sensor system being operable to selectively operate the adjuster to adjust the running clearance of the brake upon a determination of an increased likelihood of a braking event.

According to a further aspect of the present invention there is provided a brake system including a mechanically operated brake including friction material, a rotor, an adjuster for adjusting a running clearance between the friction material and the rotor, a sensor system for determining a temperature of a brake component, the sensor system being operable to selectively operate the adjuster to adjust the running clearance of the brake towards a desired running clearance based on the temperature.

According to a further aspect of the present invention there is provided a brake system including a mechanically operated brake including friction material, a rotor, an adjuster for adjusting a running clearance between the friction material and the rotor, a sensor system for determining a state of wear of a brake component, the sensor system being operable to selectively operate the adjuster to adjust the running clearance of the brake towards a desired running clearance based on the state of wear of the brake component.

According to a further aspect of the present invention there is provided a method of adjusting a brake, the method may include the steps of:

providing a mechanically operated brake including friction material, providing a rotor, providing an adjuster for adjusting a running clearance between the friction material and the rotor, providing a sensor system for determining a likelihood of a braking event, and upon a determination of a decreased likelihood of a braking event operating the adjuster to adjust the running clearance of the brake.

Upon a determination of a decreased likelihood below a predetermined likelihood of a braking event, the adjuster may be operated to adjust the running clearance of the brake.

The running clearance may be adjusted to increase the running clearance.

The sensor system may be capable of determining a position and/or velocity and/or acceleration of an associated vehicle.

The sensor system may include data relating to terrain.

The sensor system may include a navigational system, preferably a satellite navigational system.

The sensor system may be capable of determining the pitch inclination of an associated vehicle.

The sensor system may include a throttle position sensor.

The method may including the steps of:

subsequently, upon a determination of an increased likelihood of a braking event operating the adjuster to adjust the running clearance of the brake.

According to a further aspect of the present invention there is provided a brake system including a mechanically operated brake including friction material, a rotor, an adjuster for adjusting a running clearance between the friction material and the rotor, a sensor system for determining a likelihood of a braking event, the sensor system being operable to selectively operate the adjuster to adjust the running clearance of the brake upon a determination of a decreased likelihood of a braking event.

The sensor system may define a collision avoidance system. A collision avoidance system is an automotive safety system designed to reduce the severity of an accident. Collision avoidance systems are often known as pre-crash systems, forward collision warning systems, or collision mitigation systems. They may use a radar and/or laser and/or cameras to detect an imminent crash. Collision avoidance systems may, in a first phase, provide a warning to the vehicle operator of an impending accident. The warning may be a visual warning or an audible warning. In a second phase, typically in the absence of a reaction of the vehicle operator to the first phase warning, the collision avoidance system may automatically apply the brakes of the vehicle. Thus where the system provides a warning of an impending accident, then there is an increased likelihood of a braking event, since either the vehicle operator is more likely to apply the brakes or the system itself is more likely to automatically apply the brakes.

Note that some collision avoidance systems only provide a warning, i.e. they do not automatically apply the brakes. Other collision avoidance systems provide both a warning and will also automatically apply the brakes under predefined circumstances.

In a further embodiment the sensor system may define a lane departure warning system. Lane departure systems are known whereby when a vehicle departs from a lane in a manner indicative of drowsiness of a vehicle operator, then a warning is made. The warning is primarily aimed at attracting the operator's attention and ensuring that the vehicle is driven down the centre of the appropriate lane. However, in conjunction with returning the vehicle to the centre of the appropriate lane, there is nevertheless an increased likelihood of the brakes being applied.

Accordingly, collision avoidance systems and lane departure systems are able to make a determination of an increased likelihood of a braking event.

The brake may be fitted to a land vehicle, in particular a heavy land vehicle, such as a truck or lorry or coach or bus.

BRIEF DESCRIPTION OF THE DRAWINGS

The invention will now be described, by way of example only, with reference to the accompanying drawings in which:

FIG. 1 shows a brake system according to the present invention,

DETAILED DESCRIPTION

As required, detailed embodiments of the present invention are disclosed herein; however, it is to be understood that the disclosed embodiments are merely exemplary of the invention that may be embodied in various and alternative forms. The FIGURE are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

With reference to FIG. 1 there is shown a vehicle 10 having a brake 12. The brake 12 includes a caliper 14 which is slidably mounted via pins 16 (only one shown) on a brake carrier 15. Brake carrier 15 is mounted on the vehicle 10, typically on a suspension component of the vehicle 10. Accordingly the caliper 14 can move in the direction of arrow A and in the direction of arrow B.

The vehicle 10 includes a brake rotor, in this case a brake disc 18 which is rotatably mounted about axis C. The brake disc 18 is rotatably fast with a wheel (not shown) which also rotates about axis C.

On opposite axial sides of the brake disc there are brake pads 20 and 22. Brake pad 20 includes a brake pad back plate 20A and friction material 20B. Brake pad 22 includes a brake pad back plate 22A and friction material 22B.

Adjacent brake pad 22 is an adjuster mechanism 24. The adjuster mechanism includes a thrust assembly 24A and an adjuster system operable to change the length of the thrust assembly. The thrust assemblies shown in EP0995923 and EP1000263 are suitable for use in the present invention. An actuation shaft (or operating shaft) 26 is mounted in the caliper 14 and is rotatable about axis D. A roller 28 is supported on the actuation shaft 26 and engages a right hand end (when viewing FIG. 1) of the thrust assembly 24A.

Operating lever 30 is attached to the actuating shaft 26. An actuator 32 is mounted on the caliper 14, and includes an actuator rod 34, which engages an end 30A of the actuating lever 30.

The actuator 32 is a mechanically operated actuator, in this case an air operated actuator.

As shown in FIG. 1, the brakes are in a released condition, operating lever 30 having being rotated clockwise about axis D such that a gap G1 exists between brake pad 20 and brake disc 18 and a gap G2 exists between brake pad 22 and brake disc 18. Accordingly, the running clearance is G1+G2.

In order to apply the brakes the actuator 32 is operated such that the actuator rod extends from the actuator and moves in a direction of arrow A thereby rotating the operating shaft 26 anti-clockwise about axis D. Because the roller 28 is offset from axis D, the roller 28 moves in the direction of arrow A which causes the thrust assembly 24A to move in a direction of A which forces the brake pad 22 in the direction of arrow A, thereby closing the gap G2. Continued anti-clockwise rotation of the operating shaft 26 then causes the caliper 14 to move in the direction of arrow B as the hole 17 in the caliper slides on pin 16. This causes gap G1 to close. At this moment the gaps G1 and G2 have been closed but, because the brake pads are not being forced against the brake disc 18, no braking force exists to retard to slow the vehicle. Only when the actuator 32 continues to move the actuator rod 34 in the direction of arrow A, does a clamping force of the brake pads on the discs start to be generated. The clamping (or braking) force is dependent upon, amongst other things, the force in the actuating rod 34, a higher force actuating rod 34 resulting in a higher clamping force and therefore a higher retardation of the vehicle.

The adjuster mechanism 24 is electrically operated by electric motor 25. Thus the thrust assembly 24A can be extended (or lengthened) (such that end 24C moves away from end 24D) or retracted (or shortened) (such that end 24C moves towards end 24D) by operation of the electric motor 25. It will be appreciated that by extending the thrust assembly 24A the running clearance will reduce and by retracting (or shortening) the thrust assembly 24A the running clearance will increase.

As will be appreciated, the adjuster mechanism 24 is a distinct component from the actuator 32. The actuator 32 performs the function of applying and releasing the brake. The adjuster mechanism 24 performs the function of adjusting (in particular the running clearance) of the brake. The adjuster mechanism is not used to apply the brake. The actuator mechanism is not used to adjust the running clearance of the brake. The actuator 32 is an air operated actuator though other types of mechanical actuator may be used. The adjuster mechanism 24 is electrically operated, i.e. in order to adjust the adjuster mechanism the electric motor 25 must be operated.

The vehicle 10 includes a sensor system 40, the sensor system includes a sensor 44, a processor 42, in one embodiment a microprocessor. There is also included a memory 46 such as data storage, such as flash memory.

The sensor system 40 determines the likelihood of a braking event, for example the likelihood that the brakes will be applied. Upon a determination of an increased likelihood of brakes being applied, for example upon a determination of increased likelihood above a predetermined likelihood of a braking event, the adjuster 24 is operated to adjust the running clearance, such as from a first non-zero value to a second non-zero value without obtaining a zero value. In this way it is possible to adjust the running clearance in advance of the brakes being applied. Where the adjustment to the running clearance is such so as to reduce the running clearance, then, advantageously, when the brakes are subsequently applied, because the running clearance has been reduced, then the associated vehicle slows down more quickly because the delay between moving the brake pads and the brakes retarding the vehicle is reduced, since the running clearance has been reduced.

In more detail, it is known to provide vehicles with sensors in the form of cameras. The field of view of the camera includes the terrain ahead of the vehicle, for example it includes the road ahead of the vehicle. Such systems, when they detect a hazard, such as another vehicle close in front of the vehicle in question, provide a warning signal, such as a noise to the vehicle operator of the vehicle in question. Under these circumstances, the likelihood of the brakes being applied is increased, because when the operator of the vehicle in question recognises that he or she is too close to the vehicle in front, then typically he or she will apply the brake.

Under these circumstances the adjuster 24 is adjusted by the electric motor to reduce the running clearance to a smaller running clearance. Under these circumstances, if the brakes are applied, then the vehicle will slow down sooner.

In an alternative system, the sensor system 40 may include a camera which has a field of vision which includes the operator of the vehicle. Such a camera and associated face recognition system can recognise when the vehicle operator is becoming drowsy. Typically, when drivers become drowsy their attention to driving decreases or lapses. However, suddenly their attention to driving may return, especially under emergency situations whereupon they may immediately apply the brake. Thus, a sensor system having a camera whose field of vision includes the operator of the vehicle can detect an increased likelihood of a brake event and the running clearance can be adjusted by the adjuster such that in the event of a brake application the brakes will slow the vehicle more quickly than if the running clearance were larger.

In particular, when the driver's attention to driving returns and he or she recognises an emergency braking situation, he or she will quickly move their foot off the accelerator pedal. This quick release of the accelerator pedal would occur more quickly than if the operator were paying full attention under normal driving conditions. Thus, the sensor system may include a throttle position sensor and where that throttle position quickly moves from a fully or partially on position to an off position this may be an indication that there is an increased likelihood of a braking event.

The sensor system may be capable of determining the position of the vehicle and the velocity of the vehicle. The velocity of the vehicle is determined from the speed of the vehicle and the direction of travel of the vehicle. The sensor system may include data relating to terrain, in particular data relating to the terrain in the immediate vicinity of the vehicle. Where the system knows the position and velocity of the vehicle and also data relating to the terrain, it is possible to determine an increased likelihood of a braking event. Thus, for example where the system determines that the vehicle is travelling along a road at a particular speed and there is a bend in that road ahead of a particular radius, the sensor system may be able to determine that the vehicle will not be able to negotiate that bend if it continues to travel at its current speed. Accordingly, the system will determine an increased likelihood of a braking event and the running clearance may be adjusted accordingly.

In the example above, the sensor system was able to determine that a vehicle will not be able to negotiate a bend if it continues to travel at its current speed. Under certain circumstances a sensor system may further be able to determine that the current speed of the vehicle and the closeness of the bend to the vehicle is such that the vehicle will be unable to slow down to a speed at which it will be able to negotiate the bend. Under these circumstances the system may recognise that a road traffic accident is likely. Since it is not necessary to be able to immediately drive away from a road traffic accident, then the adjuster mechanism can reduce the running clearance to zero or substantially zero. In the event that the operator applies the brakes, then the vehicle will immediately slow down (since there is no running clearance to be closed) and the vehicle will stop sooner than it otherwise would have done. Because the running clearance was reduced to zero prior to the brakes being applied, once the brakes have been applied and have heated up, then when the vehicle comes to a halt and the brakes are released, the friction material will continue to be pressed into engagement with the rotor due to the thermal expansion of various brake components, thereby preventing the vehicle continuing its journey. However, the advantages of slowing the vehicle down quickly outweigh the disadvantage of being unable to immediately continue the journey.

The sensor system may include a navigational system, in particular may include a satellite navigation system.

The sensor system may be able to determine the ambient conditions relative to the vehicle. Thus, where conditions may be slippery, for example where the ambient conditions are wet, for example when it is raining, or where the ambient conditions may result in an a lowered frictional coefficient between the vehicle wheels and the terrain, for example if it is below freezing, then the system will be able to determine an increased likelihood of a braking event. Thus, under wet or icy conditions it may be necessary to brake sooner than if the conditions were drier and warm. Similarly, in wet or icy conditions it may be necessary to brake more because the vehicle will not be able to negotiate a bend in the road at the same speed as if the conditions were dry and warm.

In the examples above, when there is a determination of an increased likelihood of a braking event the adjuster has been arranged to reduce the running clearance between the rotor and the brake pads. However, under other circumstances this need not be the case.

Consider the scenario where a satellite navigation system determines that there is a long descent on the road ahead. Such a long descent, with a fully laden heavy vehicle such as a truck, will result in significant amounts of energy needing to be dissipated by the brake system and accordingly the brakes will become hot during that descent. In order to ensure that even with hot brakes there is still some running clearance, then the adjuster may be adjusted to increase the running clearance prior to individual brake applications as the vehicle descends the hill. Such a system allows for a relatively small running clearance to be normally adopted, but an increase in the running clearance can be adopted prior to a braking event which is likely to result in significant amounts of energy being applied to the brakes.

As described above, where there is a determination of an increased likelihood of a braking event, the running clearance may be changed. Under certain circumstances the running clearance may be reduced, and under other circumstances the running clearance may be increased. However, the invention is equally applicable to scenarios where there is a determination of a decreased likelihood of a braking event. Thus, a satellite navigation system may determine that the vehicle is about to ascend a hill, and under such circumstances braking is less likely to occur since, when the operator takes his or her foot off the accelerator pedal the incline of the hill naturally slows the vehicle down. An inclination sensor which determines the pitch inclination of the vehicle may be used to determine an increased or decreased likelihood of a braking event. Thus, if the inclination sensor determined that the vehicle is "nose up" then this is an indication that the vehicle is ascending a hill, and the likelihood of a braking event is reduced. Alternatively, if the sensor determines that the vehicle is "nose down" then this is an indication that the vehicle is descending a hill and therefore the likelihood of a braking event is increased.

Other indicators of a reduced likelihood of a braking event are that the vehicle is accelerating and/or that the vehicle is changing up through gears of its gearbox.

Upon a determination that there is a decrease in the likelihood of a braking event, it is possible to increase the running clearance of the brake. This increase in running clearance reduces parasitic brake drag. FIG. 1 shows the scenario where the running clearance is defined by gap G1 between rotor 18 and brake pad 20 and gap G2 between rotor 18 and brake pad 22. However, because vehicles often travel over uneven roads, the situation can arise where brake pad 20 vibrates or otherwise moves to the right when viewing FIG. 1 closing gap G1 but opening a gap between brake pad back plate 20A and adjacent surface on the caliper. Under these circumstances this gap would be the same amount as gap G1 but would not be between the same components. Under these circumstances there will be parasitic brake drag because the brake pad friction material 20B will be in contact with the brake disc 18. Similarly, vibration and the like can cause brake pad 22 to move to the left when viewing FIG. 1 such that gap G2 closes and a similar gap appears between the brake pad back plate 22A and end 24D. Again, in these circumstances there will be a parasitic brake drag between the friction material 22B and the brake disc 18. By increasing the running clearance, the likelihood of parasitic brake drag losses occurring is reduced. Accordingly, when there is reduced likelihood of a braking event, the running clearance can be increased to reduce the likelihood of parasitic brake drag. This provides for faster acceleration and better fuel efficiency.

As mentioned above, the adjuster mechanism of EP1000263 and EP0995923 both endeavour to provide a fixed running clearance under all conditions.

However, a preferred running clearance may be dependent upon the temperature of one or more brake components and/or an amount of wear of one or more brake components.

Thus, consider FIG. 1 where brake disc 18 is a new brake disc and is unworn and brake pads 20 and 22 are new brake pads, i.e. the friction material 20B and 22B is unworn. Under these circumstances the friction material and brake disc are relatively thick, and therefore will expand by a greater amount per degree centigrade increase in temperature than if the brake disc 18 was a worn brake disc and the brake pads 20 and 22 were worn brake pads. Thus, the running clearance for new brake pads and a new brake disc is preferably larger than the running clearance for a worn brake disc and worn brake pads.

Furthermore, consider the scenario where the ambient temperature is, for example 20° C. Consider that it is necessary to slow a vehicle from 50 km/h to 0 km/h. Now consider two alternative scenarios:

Scenario 1, the brakes have not been recently used and are therefore at 20° C.

Scenario 2, the brakes have recently been used and are therefore above 20° C.

Under both scenarios a fixed amount of energy (X kJ) must be dissipated to brake the vehicle from 50 km/h to 0 km/h. Clearly the overall brake temperature under scenario 2 when the vehicle has just stopped will be greater than the overall brake temperature under scenario 1. Because, during the braking event of scenario 2, the overall brake temperature was higher, the brakes ability to dissipate the X kJ of energy to the atmosphere was better, because of the greater temperature difference between the overall brake temperature and atmosphere. Accordingly, relatively hot brakes can have a relatively smaller running clearance than relatively cool brakes.

As such, using the adjuster 24 it is possible to optimise a running clearance, depending upon a temperature of a brake component. It is also possible, using the adjuster 24, to optimise a running clearance depending upon a state of wear of a brake component.

As will be appreciated, the temperature of a brake varies as it is used. Similarly the state of wear of brake components vary as they are used. In one embodiment the temperature of a brake component may be continuously, or intermittently monitored and the running clearance may be continuously or intermittently adjusted depending upon the instantaneous temperature. Similarly the state of wear of brake components may be continuously, or intermittently monitored and the running clearance may be continuously or intermittently adjusted in line with the instantaneous state of wear of the brake component.

Friction material 20B and 22B will typically wear faster than the material of the rotor 18. This is especially the case where the rotor is a ferrous rotor and the friction material is a complex mix of different material compounds to achieve optimised levels of performance and life while minimising noise, vibration and harshness (NVH) effects. In one example, friction material will wear 10 times faster than the rotor. The sensor system can monitor the state of wear of those components as follows.

Thus, with new brake pads 20 and 22 and new rotor 18 and a specific running clearance the position of the adjuster mechanism can be set as a datum within the processor 42. The initial unworn thickness of the rotor, and the initial unworn thickness of the friction material can also be set as data within the processor memory. As the brake pads and brake disc wear then the electric motor will adjust the adjuster mechanism 24 as described above to maintain a desired running clearance. Where the electric motor 25 is a stepper motor, each step can be recorded within the memory as wear occurs on the various components the stepper motor 25 will progressively lengthen the adjuster mechanism 24. Each step equates to a set predetermined adjustment of adjuster mechanism. Thus, once the stepper motor 25 has stepped through 22 adjustments, in this example this will equate to ten steps to compensate for the wear on friction material 20B, one step to compensate from the wear on the left hand side of the rotor 18, ten steps to account for the wear of friction material 22B and one step to account for the wear on the right hand side of the rotor facing friction pad 22. In this manner the processor can maintain an ongoing estimate of the amounts of wear of friction material 20B and 22B and of rotor 18.

As mentioned above, electric motor 25 may be a stepper motor. Alternatively, electric motor 25 may be any suitable type of electric motor. Depending on the type of electric motor used, then a rotary encoder may be included within the system to determine the amount of adjustment being made.

Similarly, it is possible for the processor to provide an ongoing estimate of the temperature of various brake components. Thus, a vehicle will typically include an ambient temperature sensor. Where the vehicle has been left unused overnight, then the temperature of the brake components will be that of the temperature of the ambient air. When the vehicle is started in the morning and used, knowing the frequency of usage of the brake, and the severity of usage, then a computer model can determine an estimate of the temperature of the brake components. Alternatively, temperature sensors may be provided on the brake component of interest, for example on the brake rotor and/or on a brake pad or adjacent the brake rotor or brake pad to monitor the actual temperature of these components.

As described above, in some embodiments, the running clearance is adjusted upon a determination of a change in likelihood of a braking event. In other embodiments the running clearance is adjusted depending upon the instantaneous temperature of a brake component and/or depending upon the instantaneous state of wear of a brake component. In further embodiments running clearance can be adjusted depending upon two or more of a determination of an increased likelihood of a braking event, the temperature of the brake component, and a state of wear of a brake component.

The invention has being described in relation to disc brakes but is also applicable to other types of brake, such as brakes having brake drums.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of adjusting a brake, the method comprising the steps of:
   providing a mechanically operated brake including a friction material that is actuated by an air operated actuator having an actuator rod which in turn actuates an operating shaft;
   providing a rotor;
   providing an electrically operated adjuster operated by an electric motor for adjusting a running clearance between the friction material and the rotor, the electrically operated adjuster being distinct from the air operated actuator;
   providing a sensor system for determining a likelihood of a braking event;
   determining a temperature of a brake component;
   determining desired first and second non-zero running clearance values based on the temperature;
   upon a determination of an increase in the likelihood of the braking event, operating the electric motor to reduce the running clearance of the brake from the first non-zero running clearance value to the second non-zero running clearance value without obtaining a zero value;
   during the braking event, operating the air operated actuator to extend the actuator rod and move the friction material from the second non-zero running clearance value into contact with the rotor;
   after the braking event, releasing the air operated actuator to retract the actuator rod and move the friction material to adjust the running clearance to the second non-zero running clearance value; and
   subsequently, upon a determination of a decrease in the likelihood of a braking event, operating the electric motor to increase the running clearance from the second non-zero running clearance value to the first non-zero running clearance value.

2. The method of claim 1 wherein upon a determination of a decrease in the likelihood of a braking event below a predetermined likelihood of a braking event, the adjuster is operated to adjust the running clearance of the brake.

3. The method of claim 2 wherein subsequently, upon a determination of an increase in the likelihood of a braking event, operating the electric motor to decrease the running clearance of the brake.

4. The method of claim 1 further including the steps of:
   a) determining a state of wear of the brake component; and
   b) determining the desired first and second non-zero running clearance values based on the state of wear of the brake component.

5. The method of claim 4 further including the steps of continuously, or intermittently determining the state of wear of the brake component and determining the first and second non-zero running clearance values based on the state of wear of the brake component.

6. The method of claim 1 wherein the sensor system defines a collision avoidance system or a lane departure warning system, wherein the collision avoidance system or the lane departure warning system includes a camera having a field of vision, which field of vision includes terrain ahead of an associated vehicle or wherein the collision avoidance system or the lane departure warning system includes a camera having a field of vision, which field of vision includes an operator of an associated vehicle.

7. The method of claim 1 wherein the sensor system is capable of determining a position and velocity of an associated vehicle or wherein the sensor system includes data relating to terrain or wherein the sensor system includes a navigational system or wherein the sensor system is capable of determining ambient conditions relative to an associated vehicle or wherein the sensor system is capable of determining an ambient temperature or wherein the sensor system includes a rain sensor or the sensor system includes a throttle position sensor or wherein the sensor system is capable of determining a pitch inclination of an associated vehicle.

8. The method of claim 1 further including the steps of continuously or intermittently determining the temperature of the brake component and adjusting the desired first and second non-zero running clearance values based on the continuously or intermittently determined temperature.

9. A brake system comprising:
   a mechanically operated brake including a friction material that is actuated by an air operated actuator that actuates an actuator rod which in turn actuates an operating shaft, a rotor, an electrically operated adjuster operated by an electric motor for adjusting a running clearance between the friction material and the rotor, the electrically operated adjuster being distinct from the air operated actuator, and a sensor system for determining a likelihood of a braking event, wherein the sensor system configured to:
   operate the electric motor of the electrically operated adjuster to decrease the running clearance from a first non-zero running clearance value to a second non-zero running clearance value without obtaining a zero value upon a determination of an increased likelihood of a braking event;
   operate the air operated actuator to extend the actuator rod and move the friction material from the second non-zero running clearance value into contact with the rotor during the braking event;
   release the air operated actuator to retract the actuator rod to move the friction material to the second non-zero running clearance value to restore the running clearance after the braking event; and
   operate the electric motor to increase the running clearance from the second non-zero running clearance value to the first non-zero running clearance value upon a determination of a decrease in the likelihood of a braking event;

wherein the first and second non-zero running clearance values are based on a temperature of a brake component.

10. The brake system of claim 9 wherein the first and second non-zero running clearance values are based on a state of wear of the brake component.

* * * * *

UNITED STATES PATENT AND TRADEMARK OFFICE
CERTIFICATE OF CORRECTION

PATENT NO. : 9,989,116 B2
APPLICATION NO. : 14/447948
DATED : June 5, 2018
INVENTOR(S) : Prashant Narula et al.

Page 1 of 1

It is certified that error appears in the above-identified patent and that said Letters Patent is hereby corrected as shown below:

In the Claims

Column 12, Line 51, Claim 9:
After "wherein the sensor system"
Insert -- is --.

Signed and Sealed this
Twenty-first Day of August, 2018

Andrei Iancu
*Director of the United States Patent and Trademark Office*